United States Patent
Lapa et al.

(10) Patent No.: US 7,768,656 B2
(45) Date of Patent: Aug. 3, 2010

(54) SYSTEM AND METHOD FOR THREE-DIMENSIONAL MEASUREMENT OF THE SHAPE OF MATERIAL OBJECTS

(75) Inventors: Nikolay L. Lapa, Jaroslavl' (RU); Yury A. Brailov, Moscow (RU)

(73) Assignee: Artec Group, Inc., San Diego, CA (US)

( * ) Notice: Subject to any disclaimer, the term of this patent is extended or adjusted under 35 U.S.C. 154(b) by 32 days.

(21) Appl. No.: 11/846,494

(22) Filed: Aug. 28, 2007

(65) Prior Publication Data
US 2009/0059241 A1 Mar. 5, 2009

(51) Int. Cl.
*G01B 11/24* (2006.01)
*G01B 11/30* (2006.01)
(52) U.S. Cl. ........................ 356/603; 356/601; 356/602
(58) Field of Classification Search .......... 356/601–604
See application file for complete search history.

(56) References Cited

U.S. PATENT DOCUMENTS

| | | | | |
|---|---|---|---|---|
| 4,648,717 A * | 3/1987 | Ross et al. | ................... | 356/610 |
| 5,135,309 A * | 8/1992 | Kuchel et al. | ................ | 356/604 |
| 6,751,344 B1 | 6/2004 | Grumbine | | |
| 6,813,030 B2 | 11/2004 | Tanno | | |
| 6,937,348 B2 * | 8/2005 | Geng | ......................... | 356/603 |
| 7,286,246 B2 * | 10/2007 | Yoshida | ...................... | 356/605 |
| 7,330,577 B2 * | 2/2008 | Ernst et al. | .................. | 382/128 |
| 7,502,125 B2 * | 3/2009 | Suzuki | ....................... | 356/604 |
| 7,525,669 B1 * | 4/2009 | Abdollahi | ................... | 356/603 |

FOREIGN PATENT DOCUMENTS

| | | |
|---|---|---|
| JP | 2003-57191 A | 2/2003 |
| JP | 2007-163266 A | 6/2007 |
| WO | WO 03/078927 | 9/2003 |

OTHER PUBLICATIONS

PCT Notification of Transmittal of The International Search Report and The ritten Opinion of the International Searching Authority, or the Declaration (PCT Rule 44.1), Dec. 18, 2008, 10 pages.

* cited by examiner

*Primary Examiner*—Tarifur Chowdhury
*Assistant Examiner*—Michael LaPage
(74) *Attorney, Agent, or Firm*—Allan Litovsky; Greenberg Traurig LLP

(57) ABSTRACT

A system and method are provided for the 3D measurement of the shape of material objects using non-contact structured light triangulation. The system includes a light projector for projecting a structured light pattern onto the surface of any object and a camera for capturing an image of the structured light pattern acting on the surface of the object. The system further includes computing device for determining the 3D measurement of the surface shape of the illuminated object through a triangulation algorithm employed based on a calculated correspondence between the projected structured light and the captured image. The structured light includes coded elements that lie within planes passing through vertices of the central projection areas of both the projector and the camera also that pass through the space of the object being measured.

22 Claims, 15 Drawing Sheets

US 7,768,656 B2

SYSTEM AND METHOD FOR THREE-DIMENSIONAL MEASUREMENT OF THE SHAPE OF MATERIAL OBJECTS

BACKGROUND OF THE INVENTION

1. Field of the Invention

The disclosure relates to the three-dimensional ("3D") measurement of material objects.

2. Background Discussion

There are known devices and methods for performing non-contact measurement of a 3D surface shape of a material object, such as through the use of a structured-light triangulation method. The triangulation method of measuring the surface shape of material objects utilizes the projection of light onto the surface of the object that is, generally, an amplitude-modulated, time-modulated and/or wavelength-modulated ("structured light"). An image of structured light projected onto the surface of an object (hereinafter referred to as "the image") is captured by a camera in a direction different from the direction that the structured light is projected. The image is then analyzed to calculate the shape of the object's surface. A number of parameters impact analysis results, such as parameters of the particular system that forms the structured light and scans the image, the shape of the surface, the distance between the surface of the object and the components of the system, the orientation of the object in relation to the components of the system. Since generally most of the parameters listed are either previously known or easily identified, with the exception of the shape of the object, the distance between the surface of the object and the components of the system, the orientation of the object in relation to the components of the system, it is possible to determine the shape of the object's surface using a triangulation method to analyze the image.

SUMMARY

In accordance with one or more embodiments, a system and method are provided for the 3D measurement of the shape of material objects using non-contact structured light triangulation. The system includes a light projector for projecting a structured light pattern onto the surface of any object and a camera for capturing an image of the structured light pattern acting on the surface of the object. The system further includes computing device for determining the 3D measurement of the surface shape of the illuminated object through a triangulation algorithm employed based on a calculated correspondence between the projected structured light and the captured image. The structured light includes coded elements that lie within planes passing through vertices of the central projection areas of both the projector and the camera, where such planes also that pass through the space of the object being measured. This arrangement allows a correspondence between the coded elements in the structured light and the captured image to be easily identified by restricting the number of directions in which the structured light can be deformed to one known direction, thereby providing a system and method of quickly and accurately obtaining the 3D measurement of the surface shape of objects using a non-contact structured-light triangulation methodology.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
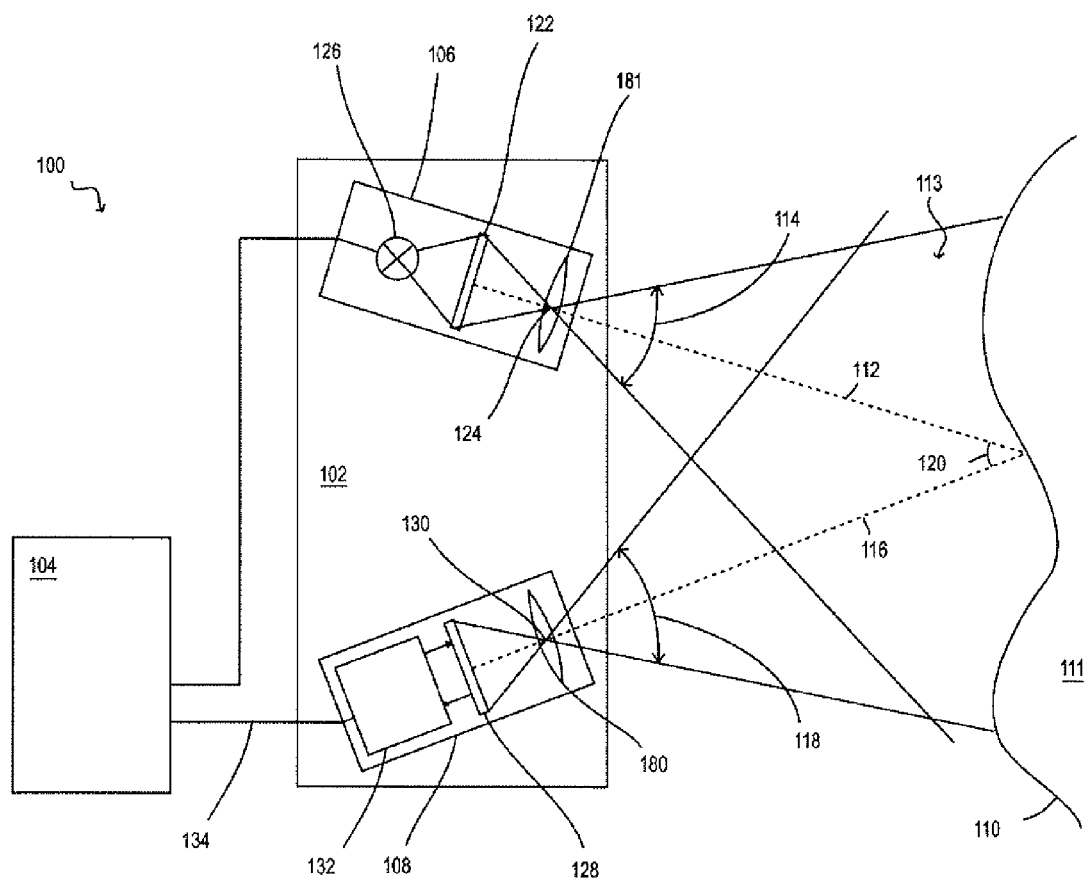
FIG. 1 is a block diagram representation of a system for the 3D measurement of the shape of material objects in accordance with one or more embodiments of the present disclosure.

In general, the present disclosure includes a system and method for the 3D measurement of the shape of material objects. Certain embodiments of the present disclosure will now be discussed with reference to the aforementioned figures, wherein like reference numerals refer to like components.

Referring now to FIG. 1, a block diagram illustration of a system 100 for the 3D measurement of the shape of material objects is shown generally in accordance with one or more embodiments. The system 100 includes an optical unit 102 and a computing device 104. The optical unit 102 produces structured light with one or more projectors 106. In one embodiment, the projector 106 is a slide projector including a light source 126 and a light modulating device 122 for modulating the light emitted from the light source 126. The light modulating device 122 may be a slide-type including a slide, a liquid crystal display (LCD)-type including a liquid crystal screen, or other device for creating structured light, where such device will be hereinafter referred to as slide 122. The projector further includes a lens 181 having a vertex 124 for projecting a slide image as structured light 113 about a light cone 114 onto the surface 110 of an object 111 being measured. In accordance with this and other embodiments, the structured light 113 can also be generated using other methods, such as interferential, moir and diffractive light generation methods.

In one or more embodiments, the projector 106 projects structured light in a wavelengths selected from one of optical, visible and infrared wavelengths. In one or more embodiments, the projector 106 comprises a flashlight. In one or more embodiments, the projector 106 is a continuous light source.

The optical unit 102 includes a camera 108 or other image detecting device for capturing an image of the structured light 113 acting on the surface 110 of the object 111. In one or more embodiments, the camera 108 includes a lens 180 having a vertex 130, a matrix radiation receiver 128 and a camera driver 132. The lens 180 forms the image on the surface of the matrix radiation receiver 128. The camera driver 132 functions as an electronic signal management and processing unit which controls operation of the matrix radiation receiver 128 and can convert the image captured by the receiver 128 to another format (e.g., VGA, bmp, jpeg, etc, as desired or required before the captured image is transferred to the camera output 134. The camera 108 includes a field of view 118 that encompasses a portion of the surface 110 of the object 111. The projector 106 includes a central projector optical axis 112 and the camera 108 includes a central camera optical axis 116, such that the triangulation angle 120 is the angle extending between where the projector optical axis 112 and the camera optical axis 116 intersect.

The computing device 104 analyzes the captured image received from the camera output 134 to perform the desired calculations, such as but not limited to the 3D shape of the surface 110 of the object 111, the distance to the object 111 and the orientation of the surface 110 being captured. The computing device 104 can also to control the projector 106 and the camera 108 and their various components included therein.

Figure 2:
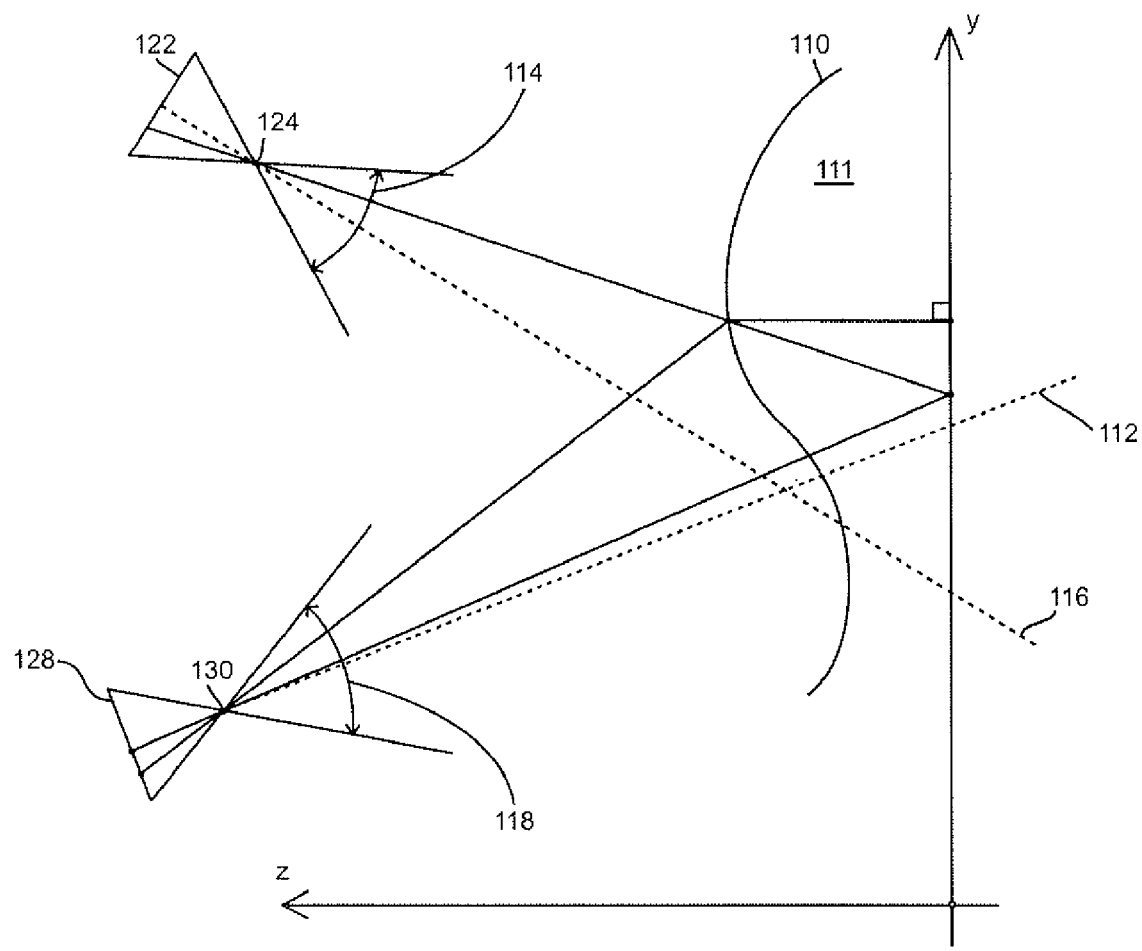
FIG. 2 is a geometric diagram of the layout and relation between a projector, a camera and a measured object using triangulation.

Referring now to the geometric layout diagram of FIG. 2, the functioning of the optical unit 102 will be described in greater detail with respect to one or more embodiments. The center 124 of the entrance and exit pupils of the projection lens 181 of the projector 106 are in one or more embodiments the vertex of the projected structured light 113, while the center 130 of the entrance and exit pupils of the lens 180 of the camera 108 are in one or more embodiments the vertex of the camera field of view 118.

Through the use of a triangulation method, a plurality of points in the slide 122 are projected onto the surface 110 of an object 111 and then mapped one-to-one to respective points in the captured image that is captured by the camera 108. The position of each point in the captured image depends on a variety of factors, such as the distance to the surface 110 of object 111 and the shape and orientation of the surface 110 in relation to the optical unit 102. In order to reconstruct the shape and position of the surface 110 being measured, each point in the captured image is associated with a respective point in the slide 122 and then the shape, position and/or orientation of the surface 110 is derived from the coordinates of the points using triangulation techniques known to those skilled in the art. FIG. 2 illustrates one possible method of calculating the shape of a surface 110 at a certain point based on the corresponding points on the slide 122 and on the captured image at the receiver 128.

Figure 3:
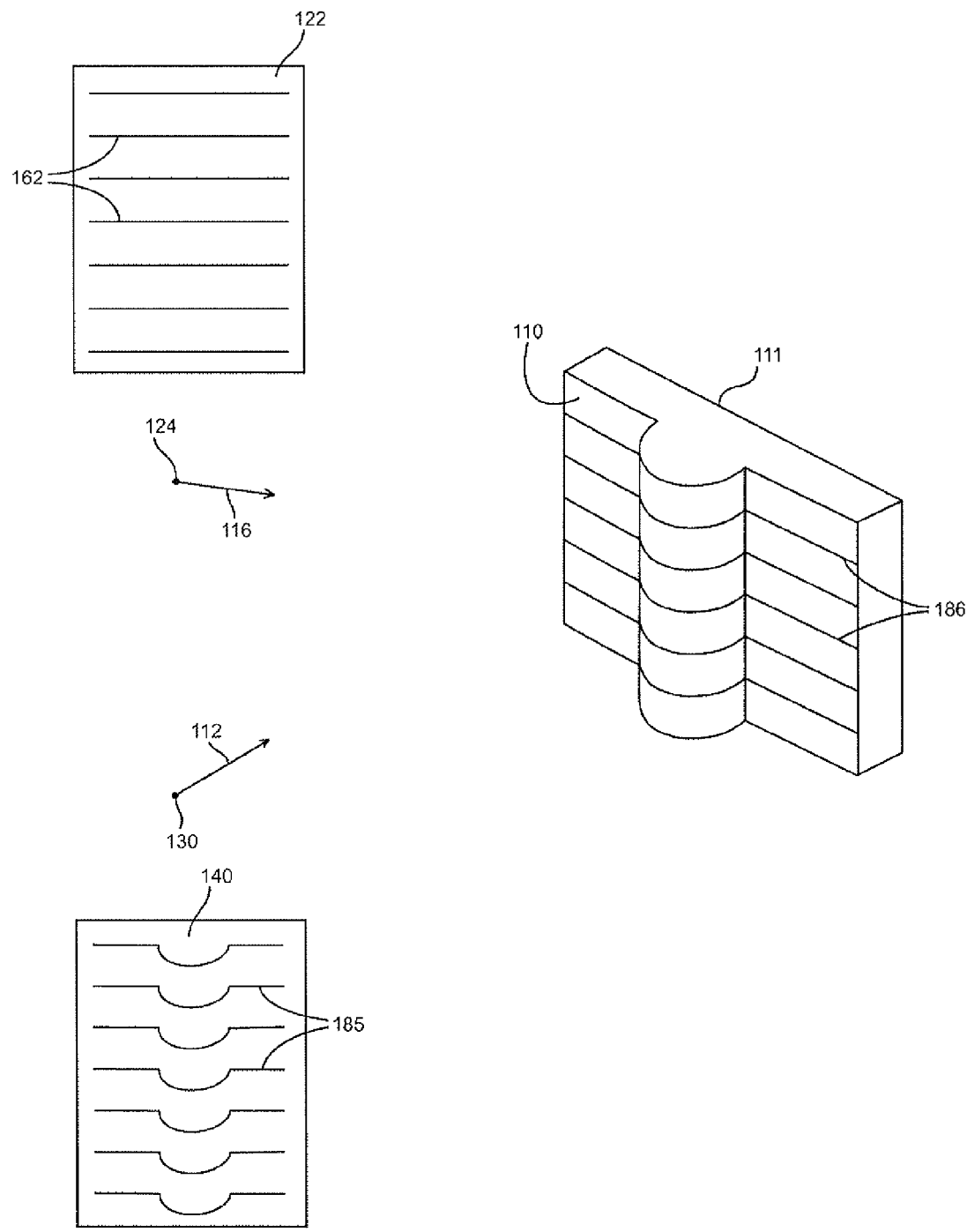
FIG. 3 is an example of a slide and the corresponding image in a structured light triangulation system.

Referring now to FIG. 3, an illustrative example is provided showing a perspective view of how a projected image and a captured image are utilized to determine the shape of the surface 110 of an object 111. A slide 122 having a pattern of lines 162 performs amplitude modulation of the projected light from the light source 126 to project the pattern as structured light 113 from the projector 106 onto the surface 110 of the object 111. A pattern of lines 186 then appears on the surface 110. The camera 108 records the corresponding resulting captured image 140 of the structured light 113 acting on the surface 110. In this example, the complexity of calculating the shape of the surface 110 resides in the complexity of identifying correspondence between lines 185 in the pattern in the captured image 140 and lines 162 in the pattern in the slide 122. It can sometimes be difficult to determine the proper correspondence between lines in the image 140 and the slide 122 because all lines have similar appearance and it is difficult to tell which line 162 in the slide 122 generated a given line 185 in the captured image 140. Further, as the shape of the object 11 becomes more complex, the more frequently the lines can break and the more complex the task becomes of finding correspondence between the slide 122 and the captured image 140.

Figure 4A:
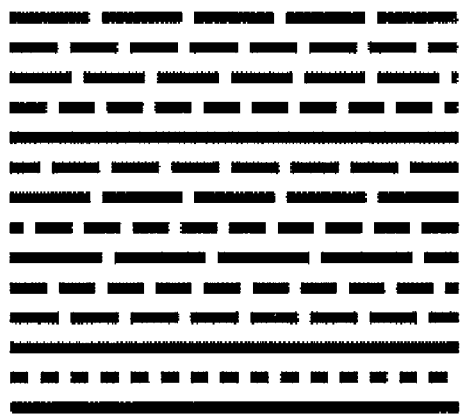
FIGS. 4A-4C are representative examples of structured light patterns used in a structured light triangulation system.
Figure 4B:
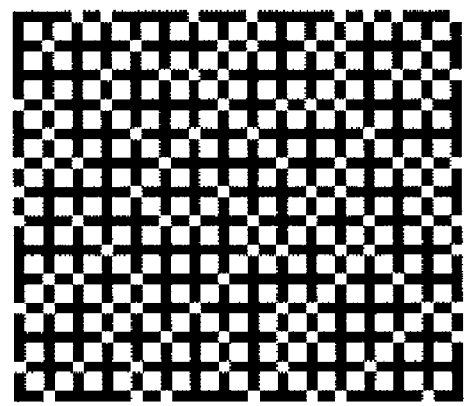
Figure 4C:
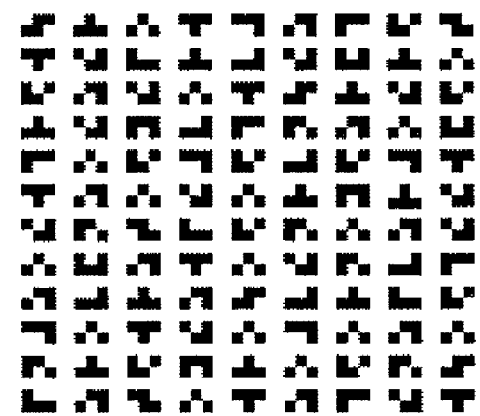

In order to simplify the task of searching for correspondence between points in the captured image 140 and the slide 122, the projected light 113 can be structured to represent an assemblage of distinct elements that can be identified in the captured image 140. The introduction of this heterogeneity into the captured image 140 is termed "coding." FIGS. 4A-4C illustrate several representative examples of coded structured light 113 that can be projected onto the surface 110 of the object 111.

Despite the presence of coding, the task of identifying elements of structured light in an image captured by the camera 108 is still complex, especially due to the presence of perspective deformation caused by the finiteness of the distance between the object's surface 110 and the projector 106 and the camera 108. Perspective deformation distorts the captured image 140 of the structured light 113 in two directions and depends on the shape of the surface 110 in each point of the captured image 140. As a result, each element of the projected structured light 113 may unpredictably shift, turn or twist its shape in the captured image 140, so that its identification will require a two-dimensional search in the captured image 140 considering all of its possible deformations (turn, shape deformation). The complexity associated with such a search often leads to frequent errors in the detection of structured light elements in the captured image 140, which results in errors measuring the shape of the object's surface 110. The searching task also requires resource-intensive search algorithms, which protracts registration time or requires a more powerful, and hence larger and more expensive, computational system or computing device 104.

In one or more embodiments, the system 100 simplifies the task of detecting elements of structured light 113 in the image 140 captured by the camera 108 by restricting the number of directions in which the structured light 113 can be deformed to one known direction, organizing a code sequence of structured light 113 in that direction, and by using special structured light coding methods, thereby achieving more effective and efficient 3D imaging.

Based on affine epipolar geometry, if two cameras are looking at the same object or scene, it is possible to draw a straight line through any point in the image of the one camera, with all points of the object or scene corresponding to that line lying along a straight line in the image of the other camera, regardless of the shape of the object or scene. This principle can be applied to surface shape scanning using structured-light triangulation to determine the 3D shape of a material object.

Figure 5:
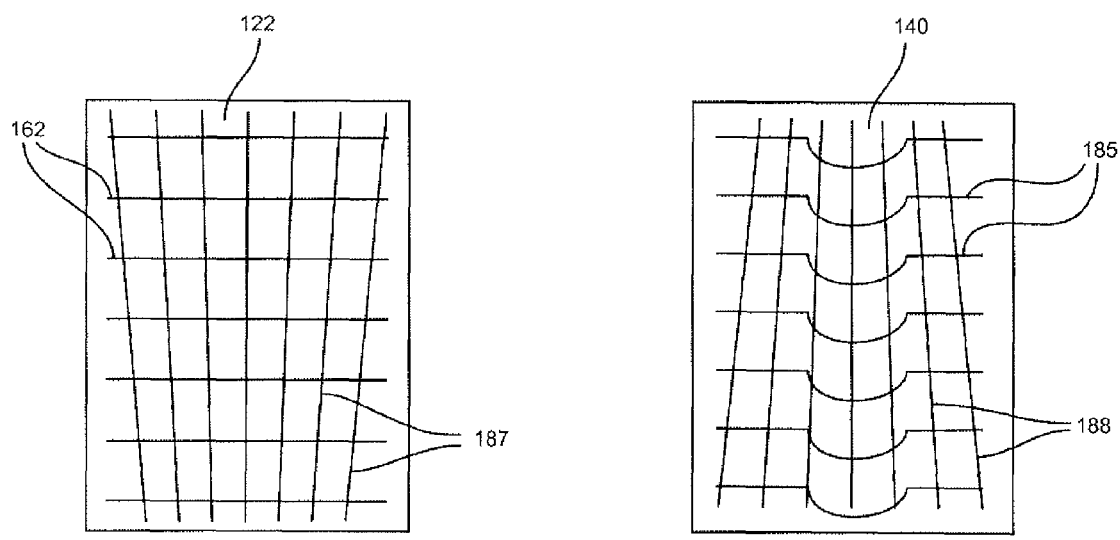
FIG. 5 is an illustration of projector and camera meridians in accordance with one or more embodiments of the present disclosure.

In one or more embodiments, the system 100 and associated method for the 3D measurement of the shape of material objects uses the principle that, regardless of the position of the projector 106 and the camera 108 in relation to each other, it is possible to draw a straight line 187 through any point of the slide 122, such that, when the projected pattern in the structured light 113 is projected on the surface 110 of the object 111, a corresponding straight line 188 exists in the image 140 captured by the camera 108, regardless of the shape of the surface 110 being captured. Any pair of such lines 187 and 188 forms a one-to-one correspondence, where such lines will be referred to as "meridians" hereafter and, in particular, as "camera meridians 188" for the captured image by the camera 108 and as "projector meridians 187" for the projected structured light 113 from the projector 106, as illustrated by way of example in FIG. 5. In one embodiment, the projector meridians 187 and camera meridians 188 are representative lines that can be represented on the surfaces of the slide 122 and the matrix radiation receiver 128, but they are not actually part of the pattern that is projected onto the object 111 and captured by the camera 108.

Figure 6:
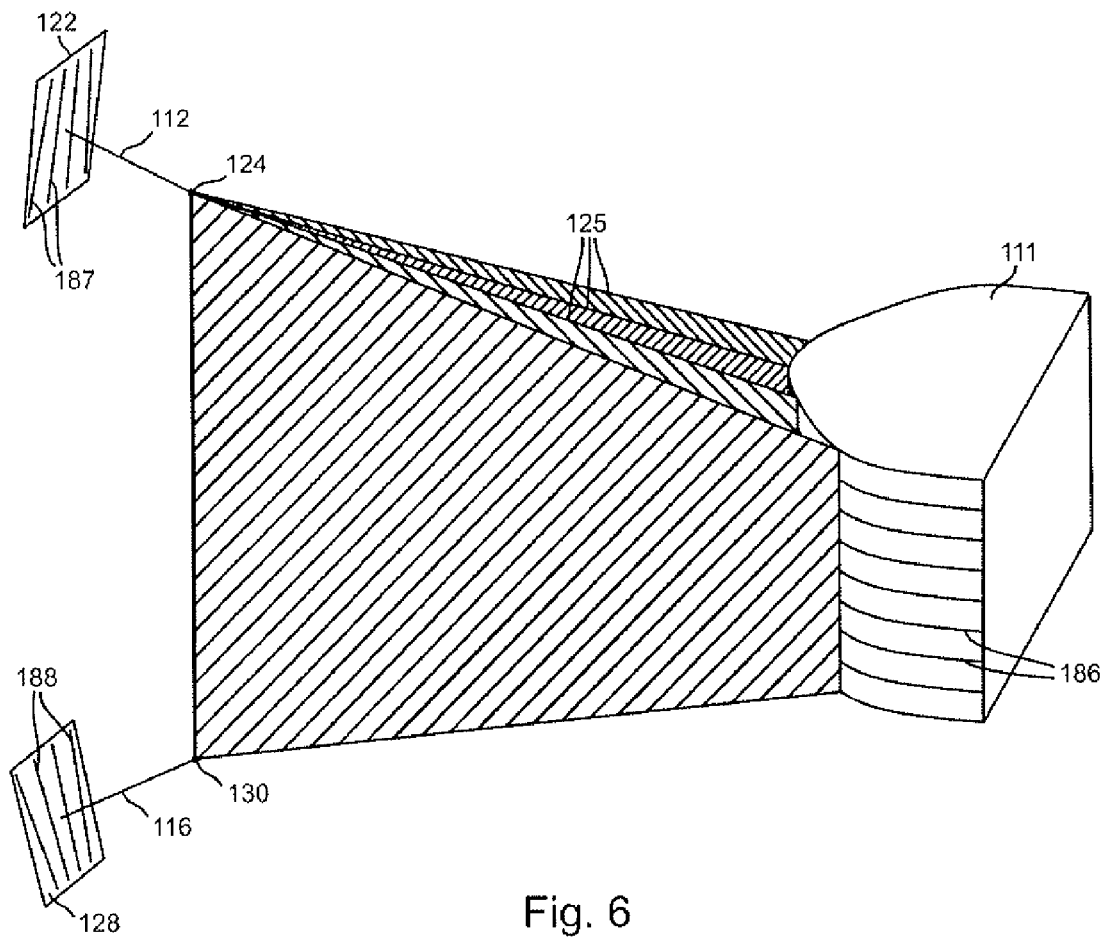
FIG. 6 is a partial perspective view of the geometric rule of meridian positioning in the system for the 3D measurement of the shape of material objects in accordance with one or more embodiments of the present disclosure.

In one or more embodiments, as illustrated in FIG. 6, the position of the meridians 187 is determined by projecting the structured light 113 from the projector lens 181 onto the surface 110 of the object 111, where each of the projector meridians 187 will lie in a plane 125 that extends from the vertex 124 of the structured light 113 projected from the projector 106 to the surface 110. Each of the camera meridians 188 in the matrix radiation receiver 128 will also lie in a respective one of the planes 125 that also extends from the vertex 130 of the camera field of view 118 of the camera 108 in the space of the object 111. The projector and camera meridians 187 and 188 lying in the same plane 125 in the space of the object 111 form a corresponding pair.

As such, there are direct interrelationship between the projector and camera meridians 187 and 188 and the planes 125 that extend from the vertices 124 and 130. The planes 125 could be considered similar to a light track for the projector and camera meridians 187 and 188 in the space of the object 111. In other words, the projector and camera meridians 187 and 188 can be considered images of the planes 125 on the slide 122 and matrix radiation receiver 128 surfaces made by the projector and camera lenses 180 and 181.

While any number of possible orientations between the projector 106, the camera 108 and the object 111 are possible, several exemplary positioning arrangements will now be described to illustrate the relation of the projector and camera meridians 187 and 188 in relation to the positioning of the projector 106 and the camera 108.

Figure 7:
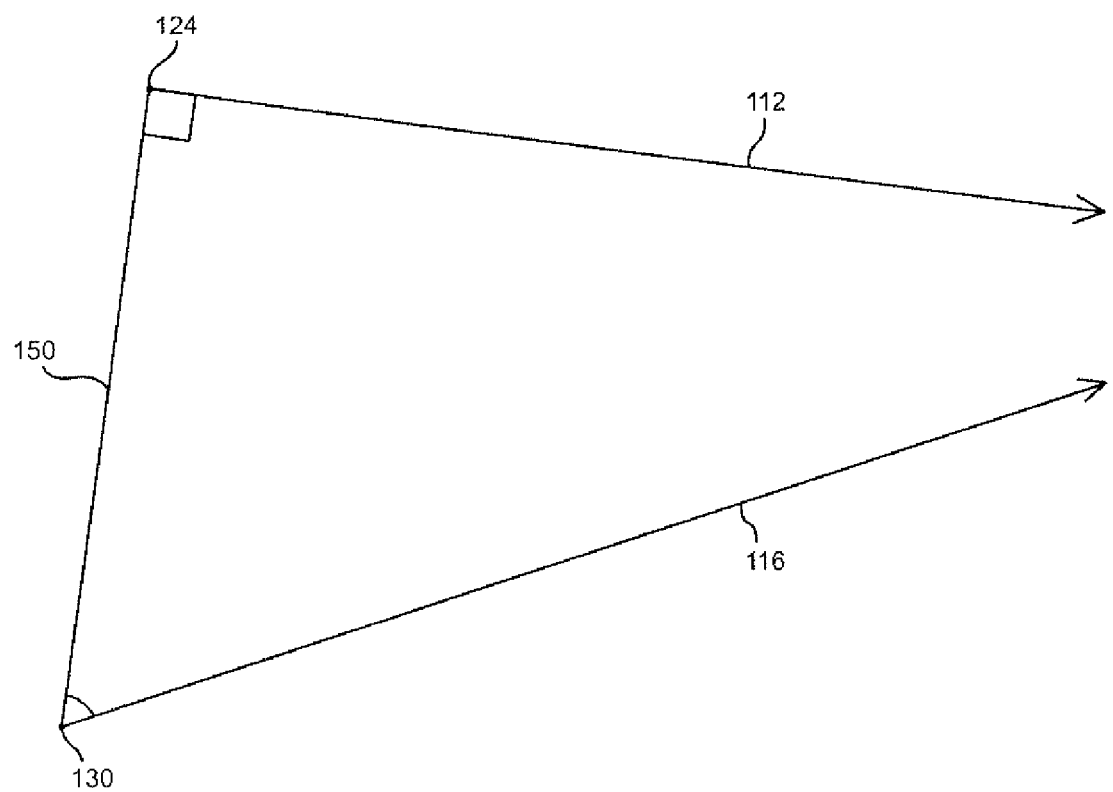
FIG. 7 is a representative example of geometric relative positioning of the projector with respect to the camera in the system for the 3D measurement of the shape of material objects in accordance with one or more embodiments of the present disclosure.
Figure 8:
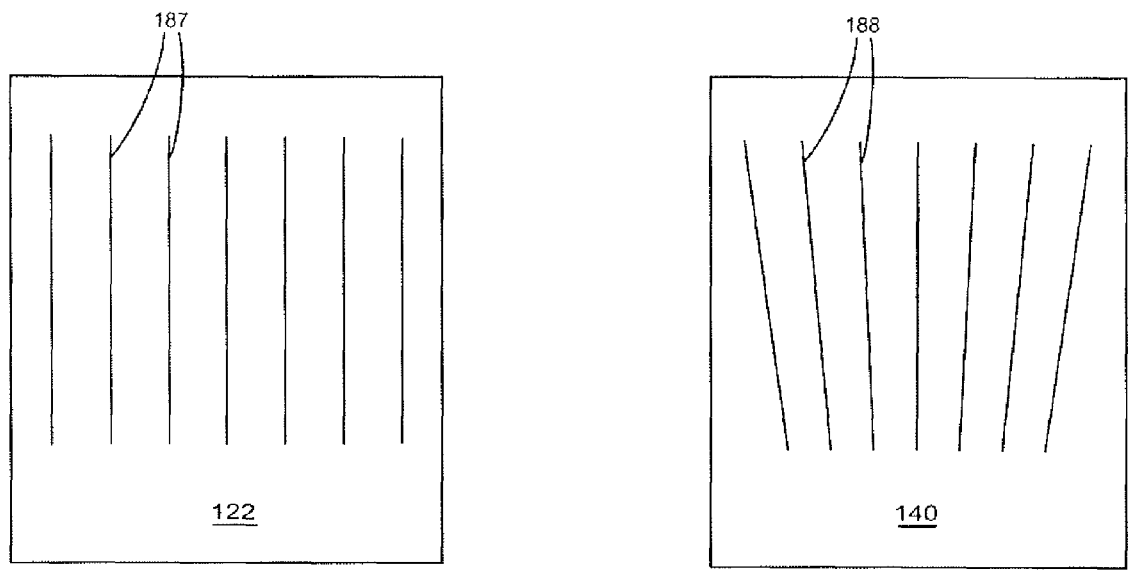
FIG. 8 is an illustration of the projector and camera meridian positions for the relative projector and camera positioning of FIG. 7.

Referring to FIG. 7, in one or more embodiments, a line 150 connecting the vertex 124 of the structured light 113 projected from the projector 106 with the vertex 130 of the field of view 118 of the camera 108 is perpendicular to the projector optical axis 112. In this embodiment, the projector meridians 187 are strictly parallel, where an illustration of the projector and camera meridians 187 and 188 corresponding to this embodiment are provided in FIG. 8.

Figure 9:
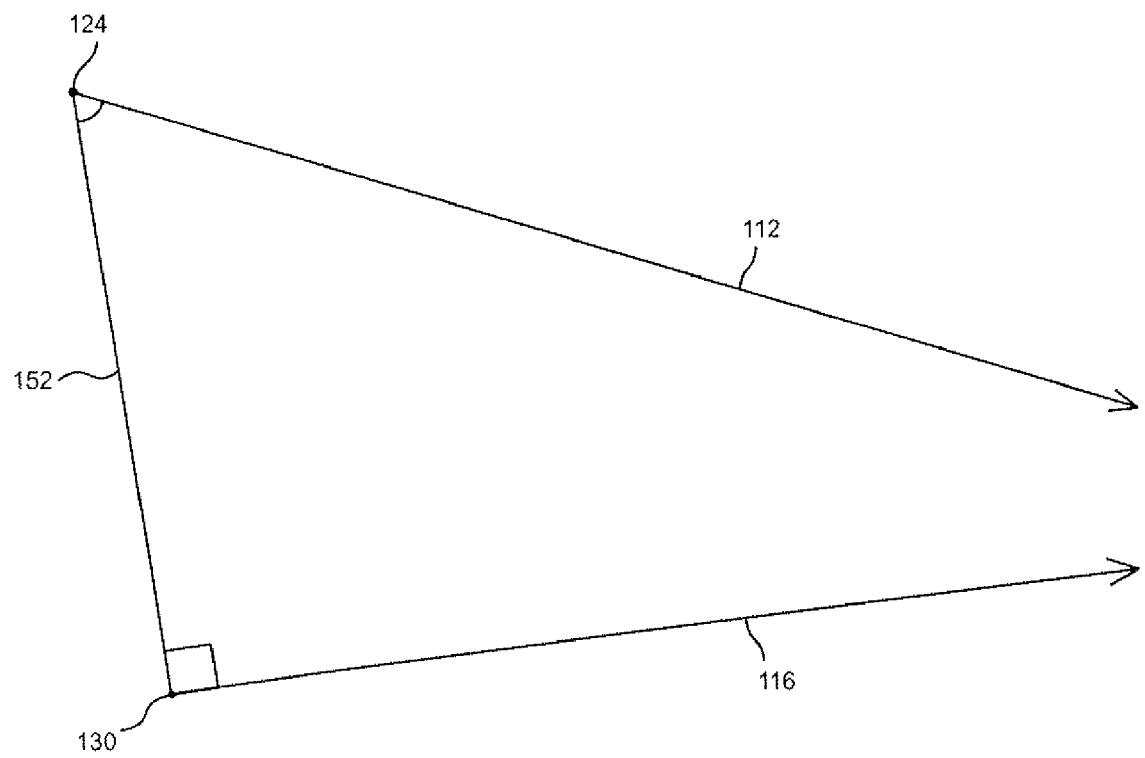
FIG. 9 is a representative example of geometric relative positioning of the projector with respect to the camera in the system for the 3D measurement of the shape of material objects in accordance with one or more embodiments of the present disclosure.
Figure 10:
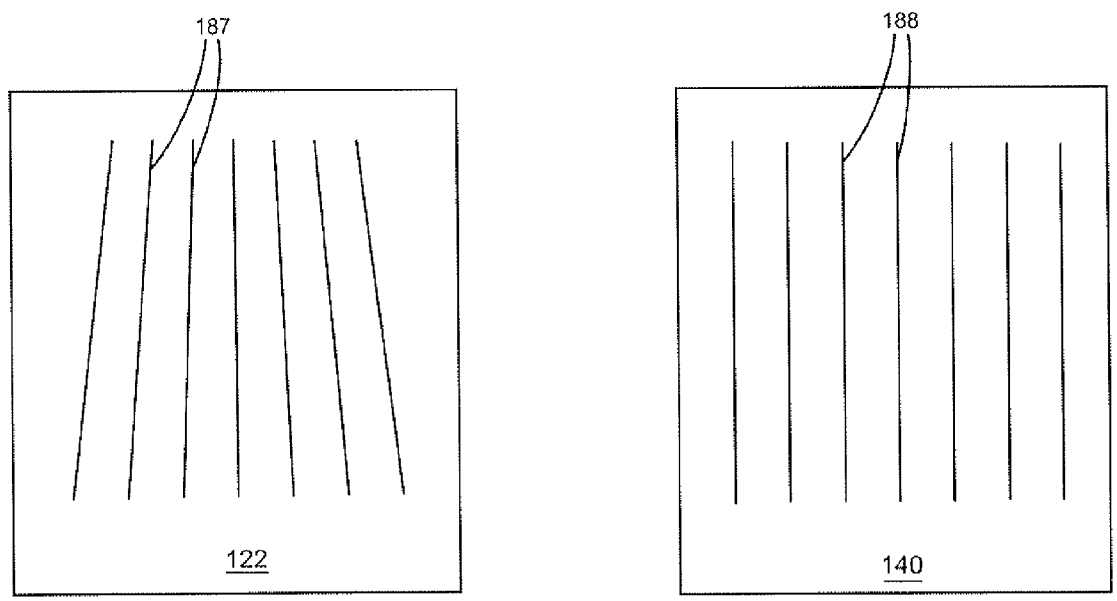
FIG. 10 is an illustration of the projector and camera meridian positions for the relative projector and camera positioning of FIG. 9.

Referring to FIG. 9, in one or more embodiments, a line 152 connecting the vertex 124 of the structured light 113 projected from the projector 106 with the vertex 130 of the field of view 118 of the camera 108 is perpendicular to the camera optical axis 116. In this embodiment, the camera meridians 187 are strictly parallel, where an illustration of the projector and camera meridians 187 and 188 corresponding to this embodiment are provided in FIG. 10.

Figure 11:
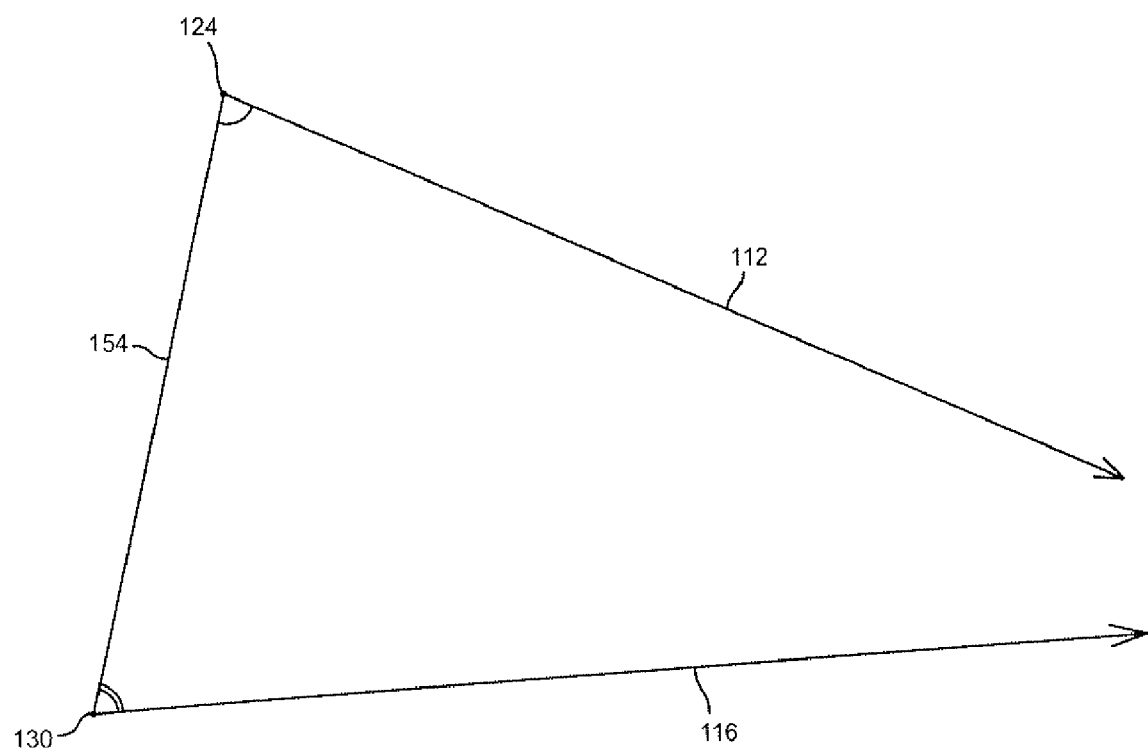
FIG. 11 is a representative example of geometric relative positioning of the projector with respect to the camera in the system for the 3D measurement of the shape of material objects in accordance with one or more embodiments of the present disclosure.
Figure 12:
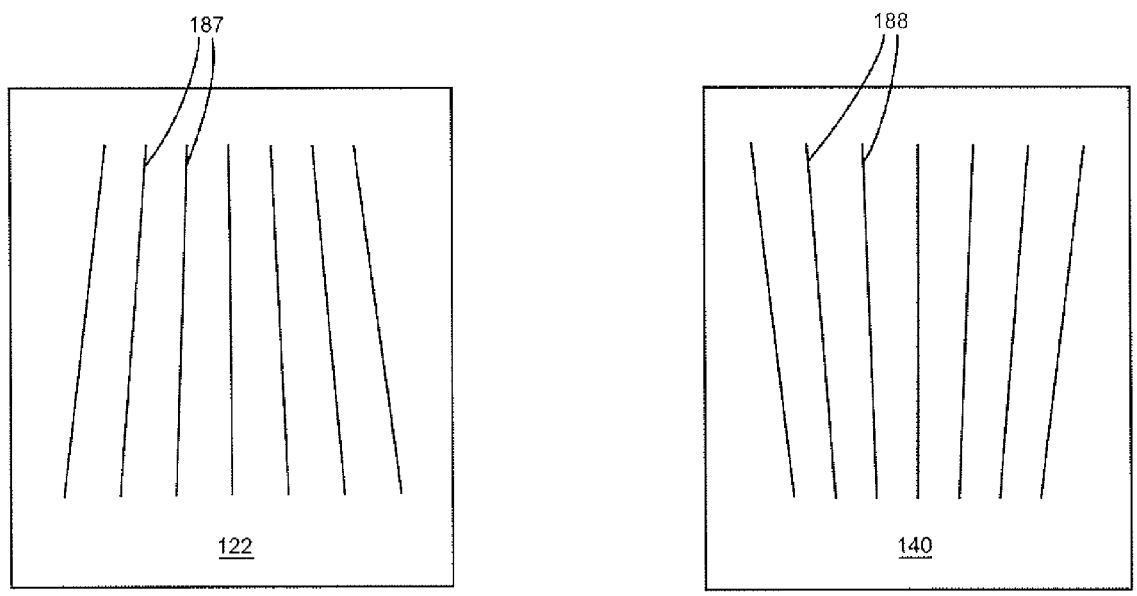
FIG. 12 is an illustration of the projector and camera meridian positions for the relative projector and camera positioning of FIG. 11.

Referring to FIG. 11, in one or more embodiments, a line 154 connecting the vertex 124 of the central projection 113 of the projector 106 with the vertex 130 of the central projection 118 of the camera 108 is not perpendicular to either the projector optical axis 112 or the camera optical axis 116. In this embodiment, neither the projector meridians 187 nor the camera meridians 188 are required to be strictly parallel, as illustrated in FIG. 12.

In one or more embodiments, the structured light 113 projected by the projector 106 can be organized to restrict the number of possible directions and deformations in the captured image, thereby simplifying the task of identifying structured light elements in the captured image and, in certain cases, achieving complete linearization of the surface shape calculation algorithm. The number of possible directions of deformations is restricted to the ones along the meridians.

In one or more embodiments, the slide 122 is selected such that structured light 113 is formed possessing at least two coded elements that lie within a plane 125 passing through the vertices 124, 130 of the projector 106 and the camera 108. In one or more embodiments, the structured light 113 can be formed as a pattern including a plurality of different groups of coded elements, wherein all of the coded elements in each group of coded elements lie within the same respective plane 125 passing through the vertices 124, 130 of the projector 106 and the camera 108. Different groups of coded elements will lie in different planes 125. In one or more embodiments such coded elements could be represented by regions of varying shape, form and/or length. For example, referring to the illustrative embodiment shown in FIG. 13, the structured light 113 is formed as a structure 160 possessing two coded elements 164 and 165 represented by regions of different thickness. The coded elements are located one by one along the plurality of parallel lines 162 so that their sequence within each line 162 forms a solid line with varying thicknesses of varying lengths. At the same time, all the coded elements lie on a plurality of parallel meridians 187 that jointly with lines 162 form a grid. In this manner, a group including a sequence of coded regions 164 and 165 of different thicknesses along each meridian 187 will form a unique sequence relative to the sequences of coded regions 164 and 165 in the other adjacent meridian 187. It is understood that other types of patterns can be generated to generate the coded elements or coded regions 164 and 165 in the structured light 113.

Figure 13:
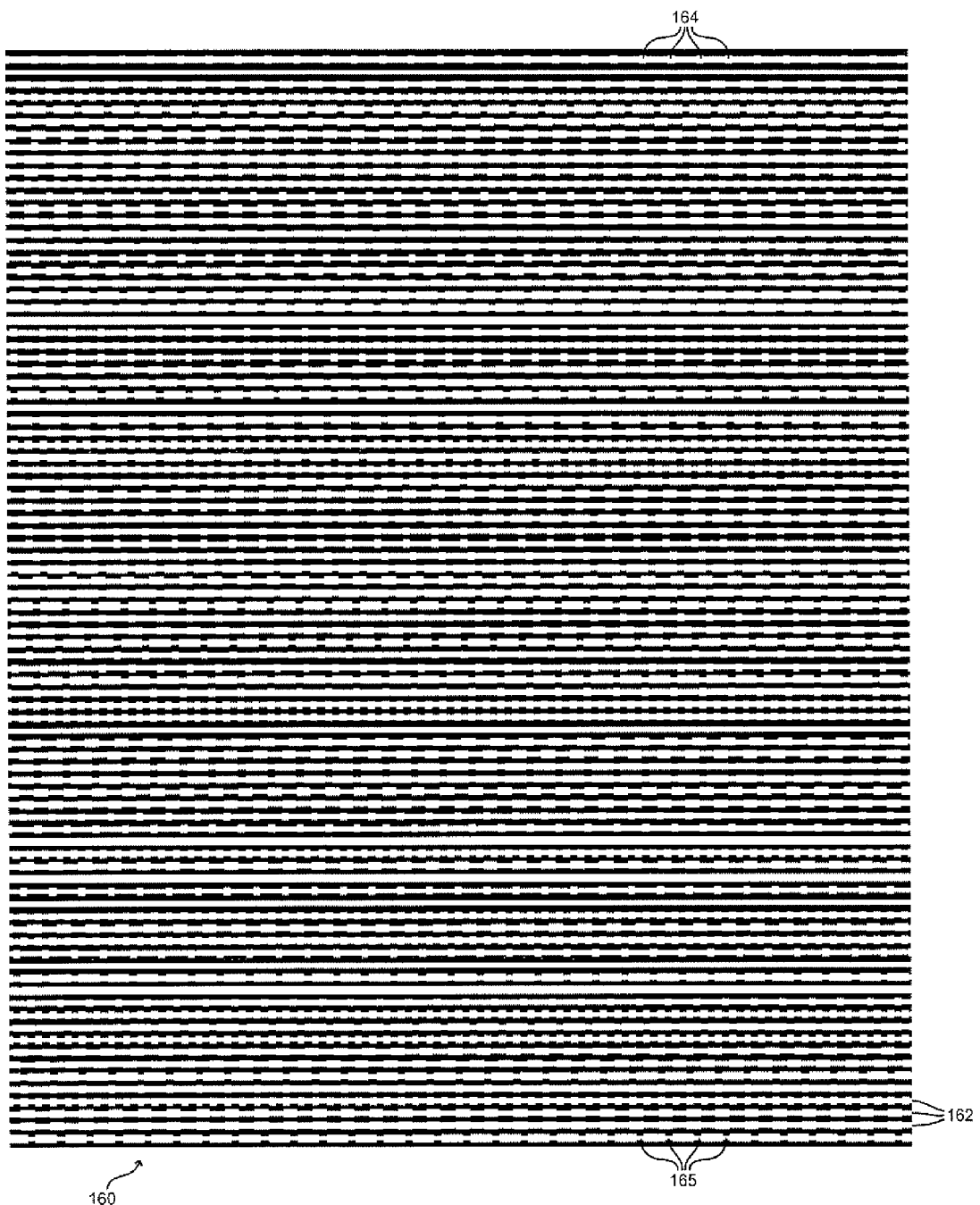
FIG. 13 is an illustration of a representative light structure generated by the in the system for the 3D measurement of the shape of material objects in accordance with one or more embodiments of the present disclosure.
Figure 14:
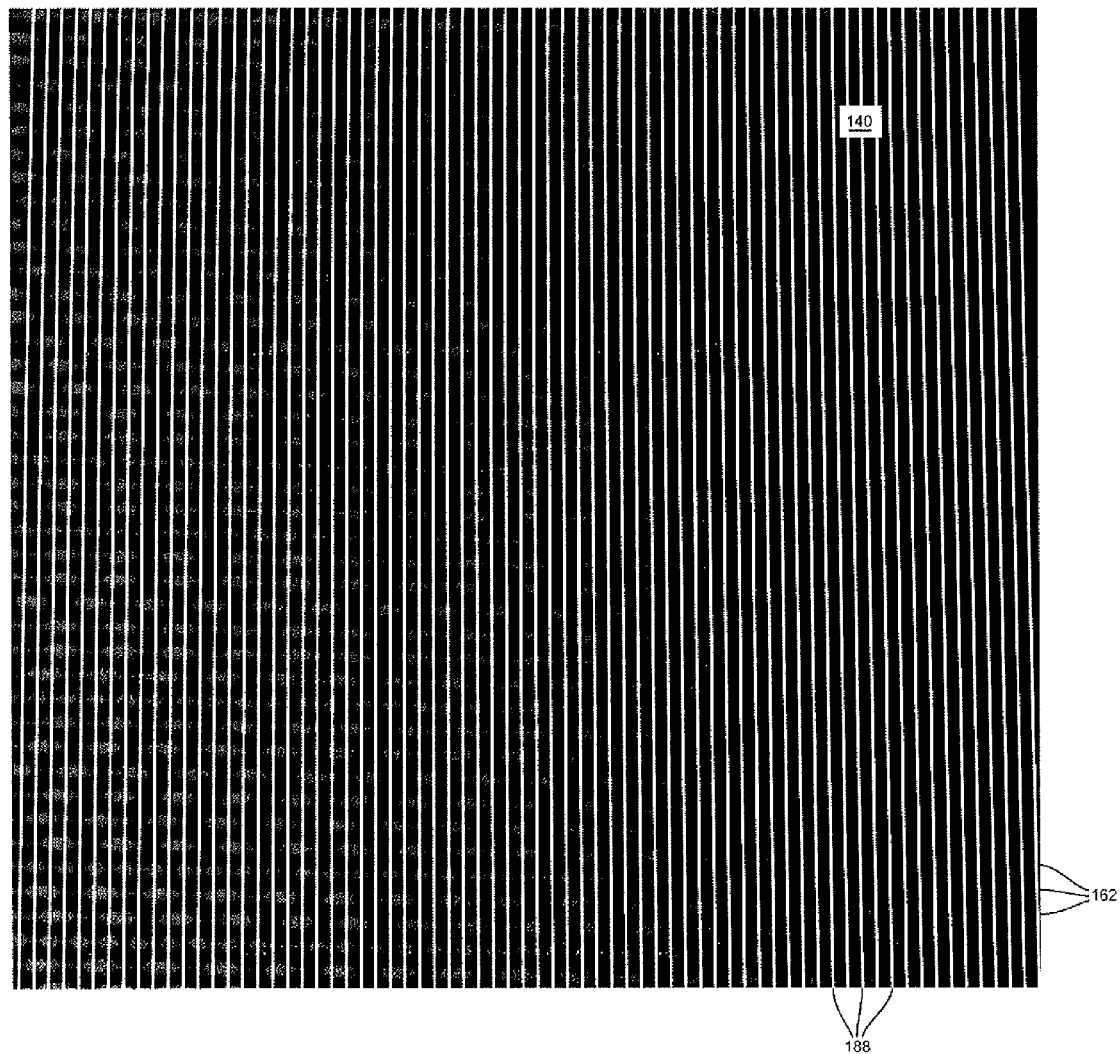
FIG. 14 is an illustration of a representative captured image taken from a planar object corresponding to the light structure of FIG. 13 for the relative projector and camera positioning of FIG. 7 in accordance with one or more embodiments of the present disclosure.
Figure 15:
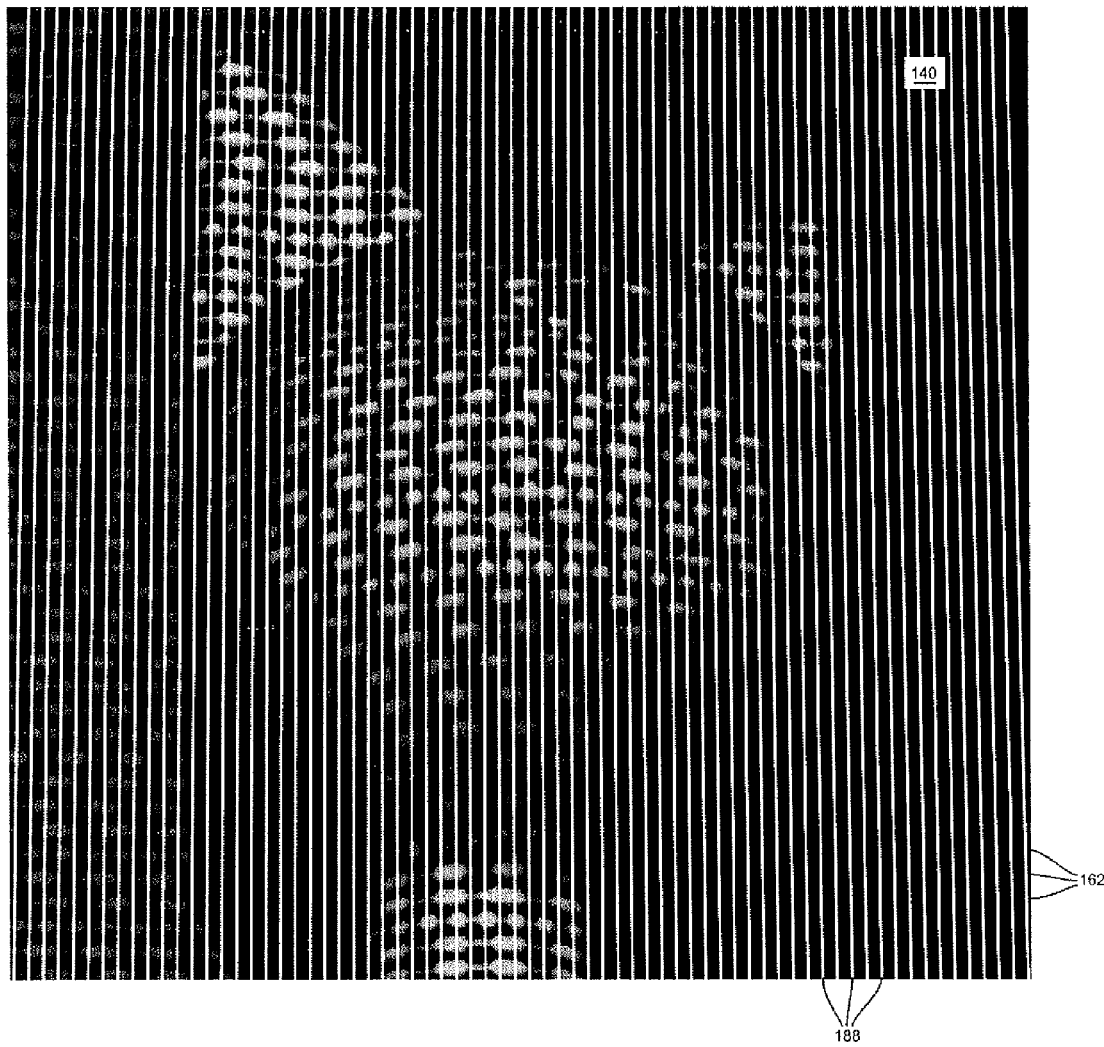
FIG. 15 is an illustration of a representative captured image taken from a non-planar object corresponding to the light structure of FIG. 13 for the relative projector and camera positioning of FIG. 7 in accordance with one or more embodiments of the present disclosure.

Using such a light structure 160 of FIG. 13, portions of representative captured images 140 recorded by the camera 108 based on the relational positioning of the projector 106 and camera 108 of FIG. 7 are illustrated in FIGS. 14 and 15 for representative planar objects (FIG. 14) and non-planar objects (FIG. 15). From these figures, it can be seen that groups of coded elements 164 and 165 each lie on a respective projector meridian 187 in the slide 122 and will also lie with a respective camera meridian 188 in the image 140 (where the projector meridians 187 and the camera meridians 188 are illustrated as vertical lines in these figures). The particular shape of the surface 110 of the object 111 being analyzed will cause the coded elements 164 and 165 in the image 140 to move only in a direction along the length of the camera meridians 188. A desired 3D measurement of the surface 110 can then be made by analyzing the movement and/or position of coded elements 164 along the camera meridians 188 with respect to the position of the respective coded elements 164 and 165 in the slide 122 and also with respect to the movement and/or position of the other coded elements 164 and 165 in the same group of coded elements 164 or 165 along the same or different camera meridians 188.

The structure 160 may be used for any of the embodiments described herein. To be used for a particular embodiment, the structure 160 should be fit into a field of the slide 122 by zooming, shifting or otherwise altering the structure 160. In addition, the structure 160 may be distorted as necessary so that groups of coded elements 164 and 165 of the structure 160 coincide with meridians chosen for the particular embodiment.

The computing system 104 may comprise a general-purpose computer system which is suitable for implementing the method for the 3D measurement of the shape of material objects in accordance with the present disclosure. The computing system 104 is only one example of a suitable computing environment and is not intended to suggest any limitation as to the scope of use or functionality of the invention. In various embodiments, the present system and method for the 3D measurement of the shape of material objects is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, networked PCs, minicomputers, mainframe computers, distributed computing environments that include any of the above systems or devices, and the like.

In various embodiments, the triangulation algorithms and the method for the 3D measurement of the shape of material objects may be described in the general context of computer-executable instructions, such as program modules, being executed by a computer. Generally, program modules include routines, programs, objects, components, data structures, etc. that perform particular tasks or implement particular abstract data types. These algorithms and methods may also be practiced in distributed computing environments where tasks are performed by remote processing devices that are linked through a communications network. In a distributed computing environment, program modules may be located in both local and remote computer storage media including memory storage devices. In one embodiment, the computing system 104 implements 3D shape measurement of objects by executing one or more computer programs. The computer programs may be stored in a memory medium or storage medium such as a memory and/or ROM, or they may be provided to a CPU through a network connection or other I/O connection.

The system and method formed in accordance with the embodiments described herein provide for the 3D measurement of the shape of material objects using non-contact structured light triangulation. Such a system and method are capable of quickly and accurately measuring the coordinates of a point cloud (i.e., light structure) projected on the surface of complex-shaped material objects in one coordinate system referenced to the system. These teachings can be applied to a whole range of scientific and engineering problems that require accurate data about the surface shape of an object, distance to the surface, or its spatial orientation. The present system and method has useful applications in many fields, including but not limited to digital imaging, the control of part shapes, computer animation, capturing the shape of objects that have cultural, historical or scientific value, shape recognition, topography, machine vision, medical procedures, special positioning of devices and robots, etc.

The invention claimed is:

1. A system for the 3D measurement of the shape of a material object, comprising:
   a light projector for projecting a structured light pattern onto a surface of said object, wherein said light projector comprises a light source, a slide with a slide pattern located on a slide surface, and a projector lens characterized by a projector lens vertex;
   a device for capturing an image of said structured light pattern reflected on said object, wherein said device for capturing an image comprises a device lens characterized by a device lens vertex; and
   a computing device for determining a measurement relating to the shape of said object using a triangulation algorithm based on a correspondence between points in said slide pattern and said image, and
   wherein said slide pattern comprises a plurality of coded elements, where each of said coded elements is characterized by at least one parameter and, where said at least one parameter defines a spatial or temporal distribution of an amplitude or a wavelength of said structured light, and
   wherein said coded elements are assigned to one of at least first group or second group, each of which first group and second group comprising at least two of said coded elements, and
   wherein at least a first slide virtual line and a second slide virtual line are defined on said slide surface, where said first slide virtual line is defined by an intersection between said slide surface and a first plane passing through said projector lens vertex and through said device lens vertex, and said second slide virtual line is defined by an intersection between said slide surface and a second plane passing through said projector lens vertex and through said device lens vertex, and
   wherein said coded elements of said first group are located along said first virtual line and said coded elements of said second group are located along said second virtual line.

2. The system of claim 1, wherein each of said coded elements having at least three points that do not lie on a straight line.

3. The system of claim 1, wherein at least first object virtual line and second object virtual line are defined on the surface of said object, where said first object virtual line is defined by an intersection between said surface of said object and said first plane and where said second object virtual line is defined by an intersection between said surface of said object and said second plane.

4. The system of claim 1, wherein the light projector is further characterized by a central optical axis, further wherein the light projector and the device for capturing an image are arranged such that a line extending between the projector vertex and the device vertex is perpendicular to the central optical axis of the light projector.

5. The system of claim 1, wherein the device for capturing an image is characterized by a central optical axis, further wherein the light projector and the device for capturing an image are arranged such that a line extending between the projector vertex and the device vertex is perpendicular to the central optical axis of the device for capturing an image.

6. The system of claim 1, wherein the light projector is characterized by a projector central optical axis and wherein the device for capturing an image is characterized by a device central optical axis, further wherein the light projector and the device for capturing an image are arranged such that a line extending between the projector vertex and the device vertex is not perpendicular to either the projector optical axis or the device optical axis.

7. The system of claim 1, wherein the light projector projects structured light in a wavelengths selected from optical, visible and infrared wavelengths.

8. The system of claim 1, wherein the light projector is a flashlight source.

9. The system of claim 1, wherein the structured light pattern comprises a plurality of coded elements that can be variably grouped together such that all of the coded elements in each group form a unique sequence relative to the sequences of coded elements in adjacent groups of coded elements.

10. The system of claim 1, wherein the computing device determines a three-dimensional shape of the surface of said object.

11. The system of claim 1, wherein said at least one parameter defines a shape, size, or color or a change thereof in time for at least one of said coded elements.

12. A method for the 3D measurement of the shape of a material object, comprising:
   projecting a structured light pattern from a light projector onto a surface of an object, wherein the light projector comprises a light source, a slide with a slide pattern located on a slide surface, and a projector lens characterized by a projector lens vertex;
   capturing an image of the structured light pattern reflected on the surface of the object with a device for capturing an image, wherein said device for capturing an image comprises a device lens characterized by a device lens vertex;
   determining a measurement relating to the surface of the object using a triangulation algorithm based on a correspondence between points in said slide pattern and said image, and
   wherein said slide pattern comprises a plurality of coded elements, where each of said coded elements is characterized by at least one parameter and, where said at least one parameter defines a spatial or temporal distribution of an amplitude or a wavelength of said structured light, and
   wherein said coded elements are assigned to one of at least first group or second group, each of which first group and second group comprising at least two of said coded elements, and
   wherein at least a first slide virtual line and a second slide virtual line are defined on said slide surface, where said first slide virtual line is defined by an intersection between said slide surface and a first plane passing through said projector lens vertex and through said device lens vertex, and said second slide virtual line is defined by an intersection between said slide surface and a second plane passing through said projector lens vertex and through said device lens vertex, and
   wherein said coded elements of said first group are located along said first virtual line and said coded elements of said second group are located along said second virtual line.

13. The method of claim 12, wherein each of said coded elements having at least three points that do not lie on a straight line.

14. The method of claim 12, wherein at least first object virtual line and second object virtual line are defined on said surface of said object, where said first object virtual line is defined by an intersection between said surface of said object and said first plane and where said second object virtual line is defined by an intersection between said surface of said object and said second plane.

15. The method of claim 12, wherein the light projector is further characterized by a central optical axis, further comprising arranging the light projector and the device for capturing an image such that a line extending between the light projector vertex and the device vertex is perpendicular to the central optical axis of the light projector.

16. The method of claim 12, wherein the device for capturing an image is characterized by a central optical axis, further comprising arranging the light projector and the device for capturing an image such that a line extending between the light projector vertex and the device vertex is perpendicular to the central optical axis of the device for capturing an image.

17. The method of claim 12, wherein the light projector is characterized by a projector central optical axis and wherein the device for capturing an image is characterized by a device central optical axis, further comprising arranging the light projector and the device for capturing an image such that a line extending between the projector vertex and the device vertex is not perpendicular to either the projector central optical axis or the device central optical axis.

18. The method of claim 12, further comprising projecting structured light in a wavelengths selected from optical, visible and infrared wavelengths.

19. The method of claim 12, further comprising projecting the structured light from a flashlight source.

20. The method of claim 12, wherein the structured light pattern comprises a plurality of coded elements that can be variably grouped together such that all of the coded elements in each group form a unique sequence relative to the sequences of coded elements in adjacent groups of coded elements.

21. The method of claim 12, further comprising determining a three-dimensional shape of the surface of said object.

22. The method of claim 1, wherein said at least one parameter defines a shape, size, or color or a change thereof in time for at least one of said coded elements.

* * * * *